United States Patent [19]
Gal et al.

[11] 4,021,367
[45] May 3, 1977

[54] PROCESS FOR RECOVERING SUSPENDED METAL CATALYST FROM THEIR SUSPENSION

[75] Inventors: Sándor Gál; Béla Eröss; Ernö Pungor; Géza Siposs, all of Budapest; Adorján Monostory; József Barlai, both of Veszprem; Margit Szeiler nee Németh, Varpalota, all of Hungary

[73] Assignees: Budapesti Muszaki Egyetem, Budapest; Peti Nitrogenmuvek, Pet, both of Hungary

[22] Filed: Oct. 28, 1975

[21] Appl. No.: 626,179

Related U.S. Application Data

[63] Continuation-in-part of Ser. No. 468,154, May 8, 1974, abandoned.

[30] Foreign Application Priority Data

May 8, 1973  Hungary .............................. GA664

[52] U.S. Cl. ............................ 252/411 R; 209/214; 209/232; 210/42 S; 210/222; 210/223; 252/410
[51] Int. Cl.² .................... B01J 23/94; B01J 25/04; B01J 25/02; B01J 23/70
[58] Field of Search .............. 252/411 R, 414, 410; 210/222, 223, 425; 209/214, 232

[56] References Cited

UNITED STATES PATENTS

| | | | |
|---|---|---|---|
| 1,339,300 | 5/1920 | Swart et al. | 209/219 |
| 1,390,688 | 9/1921 | Ellis | 252/411 R |
| 1,576,690 | 3/1926 | Ullrich | 209/214 |
| 2,459,343 | 1/1949 | Scrivener | 210/222 |
| 2,688,403 | 9/1954 | Anderson | 210/222 |
| 2,775,607 | 12/1956 | Kolbel | 252/414 |

*Primary Examiner*—Winston A. Douglas
*Assistant Examiner*—P. E. Konopka

[57] ABSTRACT

A process for recovering reusable suspended metal catalyst with a pre-determined minimum particle size from a suspension of metal particles in a liquid phase by subjecting the suspension to a continuously moving magnetic field of a minimum intensity.

1 Claim, No Drawings

PROCESS FOR RECOVERING SUSPENDED METAL CATALYST FROM THEIR SUSPENSION

CROSS-REFERENCE TO RELATED APPLICATION

This application is a continuation in-part of Serial No. 468,154 of May 8, 1974, which application is now abandoned.

The present invention relates to a process for recovering suspended metal catalysts with pre-determined minimum particle size from their suspension.

Numerous chemical processes are known in which solid catalysts are employed suspended in the reaction components which are at least partially in a liquid phase. In this manner the constant and optimum concentration of the catalyst can be achieved and the constant activity of the catalyst can be assured by adjusting its particle size, regulating the flow conditions and introducing turbulent conditions which bring about a better mixing of the reactants and the catalyst.

The catalyst will have to be removed from the reaction product. This is required to purify the end product and also to recover the catalyst which could be reused in its recovered or subsequently reactivated form, or which could be employed in the preparation of other products.

Chemical reactions of the foregoing type are generally carried out in continuous reactors which are operated with a high productivity at substantial flow rates. The subsequent steps of separating the catalyst from the end product involve costly operations, such as sedimentation, filtration, centrifuging, etc., of the solid catalyst, and not only expensive but also bulky equipments therefor. The drawbacks of such separation techniques include the fact that the recovered catalyst has to be further separated into active and inactive catalytic portions, requiring further processing steps and equipment.

According to a more advanced method, a magnet is used to separate the catalyst from the reaction mixture (see e.g. U.S. Pat. Spec. No. 1,390,688). In this way the subsequent separation of the active catalyst fraction from the inactive one can be avoided, since only the active (ferromagnetic) catalyst particles adhere to the magnet, whereas the inactive (paramagnetic) particles remain in the liquid reaction mixture. There remains, however, the need of separating the active catalyst particles with industrially usable size from the smaller fraction which has no more industrial value as catalyst. As it has already been mentioned, it is essential to use catalysts with predetermined particle size in order to exert a proper control on the catalytic processes. It is well known that the heterodispersion of catalysts is increased during reaction, because the catalyst particles become comminuted, thus the reaction mixture obtained at the end of a catalytic process always contains particles which are smaller than those required. When the separation of the catalysts is performed as described e.g. in the above-mentioned U.S. patent specification, all of the ferromagnetic (magnetizable) particles adhere to the magnet without regard to their particle size, and if this heterodisperse catalyst is fed back into the reactor, the proper control of the catalytic process cannot be ensured any more. Thus, the known processes are not able to separate the catalysts with industrially usable particle size from the undesired fraction.

It is an object of the present invention to provide a method for recovering suspended metal catalysts with industrially usable predetermined minimum particle size from their suspension.

In accordance with the present invention it has been discovered that when a magnetic field of sufficient intensity is created, whether with permanent magnets or with electromagnets, under certain conditions ferromagnetic particles can be easily separated from a wide variety of solutions having a broad range of viscosities, i.e. concentrations, with the simultaneous separation of the technologically valuable particle fraction.

In accordance with the present invention the suspension is subjected to the effect of a continuously moving magnetic field of a minimum intensity of 200 oersteds produced with at least two discs rotating on a common shaft and immersed into a suspension at most by 50% of their surface area, the said discs each having at least four magnets mounted onto them, wherein the ratio, expressed in terms of absolute values, between the flow velocity $v_s$ of the suspension and the rate of movement $v_m$ of the magnetic field expressed as the peripheral velocity at the edge of the rotating discs, is adjusted to between 1 and 2, and the ratio, expressed in terms of absolute values, between the magnetic field intensity H in oersteds and the thickness d of the liquid layer between two neighbouring discs in mm is adjusted to between 60 and 150.

In this way catalyst particles with a technologically valuable, pre-determined minimum diameter $d_x$ can be separated from their suspension. According to our observation the minimum diameter $d_x$ of the separated particles is directly proportional to the flow velocity $v_s$ of the suspension, and is inversely proportional to the magnetic field intensity H. The coefficient of proportionality is an empirical constant varying from 0.1 to 0.5, this value increasing with the concentration and viscosity of the suspension.

It is essential that the magnets mounted onto the rotating discs are arranged interruptedly, since a "moving" magnetic field, i.e. a magnetic field varying in intensity at a given point of the reaction vessel cannot be created by single continuous magnets each on the individual discs. According to a preferred solution 8 to 10 mm thick magnet rings having an outer diameter of 60 to 80 mm and an inner diameter of 20 to 30 mm are mounted onto the rotating discs along one or more circular rings. The rotating discs are prepared preferably having in sight the following factors: the distance between the individual magnet rings is preferably 5 to 10 mm, the distance between the individual circular rings is preferably 10 to 15 mm, and the distance between the edge of the rotating disc and the outer periphery of the outer circular ring is preferably 5 mm.

With consideration of the construction alone, the upper limit of the operative temperature is of about 120° C. In some instances, however, a maximum temperature far lower than 120° C has to be maintained in order to prevent the system from thermal decomposition or to avoid the appearance of a too high vapour pressure which would result in the evaporation of the solvent or would cause undesired condensation on some structural elements. Generally a vapour pressure lower than 0.1 atm. should be maintained. Furthermore, when inflammable and/or toxic solvents are processed, the temperature should be kept at a minimum value.

The lower limit of the operative temperature depends, on the one hand, on the solidification point of the suspension and, on the other hand, on the viscosity of the suspension; the value of the latter should not exceed about 25 centipoises.

The invention is further illustrated in light of the following illustrative Examples which are not intented to delimit the scope of the invention.

EXAMPLE 1

A 50% aqueous solution of sorbitol obtained from high-pressure hydrogenation of glucose, contained suspended Raney-nickel catalyst, is allowed to stream at room temperature at a linear rate of 65 mm/sec in a trough of 125 × 115 × 40 cm dimensions. 50 discs rotating on a common shaft and equipped with permanent magnet rings are immersed halfway, that is up to the axis of rotation, into the liquid. The distance between the individual rotating discs is 10 mm.

The discs are prepared as follows:

15 circular holes having a diameter of 76.2 mm are drilled into an aluminum disc (diameter: 490 mm, width: 9 mm) along a circle concentric with said disc and having a diameter of 404 mm. The circular holes are arranged on this concentric circle at the intersection points of this circle with radii including an angle of 24° with each other. Further 8 circular holes also having a diameter of 76.2 mm are drilled into said disc in even distribution, that is, arranged at the intersection points of an inner concentric circle having a diameter of 222 mm with radii including an angle of 45° with each other. The distance between the outer edge of the holes arranged along the outer concentric circle and the edge of the aluminum disc is 5 mm., whereas the distance between the inner and outer envelope circles, respectively, of the holes arranged along the outer and the inner circles is about 15 mm. The linear distance between the mid-points of the holes arranged along the outer circle is 84 mm. (when measured on the circle, this distance is 84.6 mm), and the minimum distance between the edges of the individual holes is of about 7 mm. The respective data of the holes arranged along the inner circle are 85 mm. (or 87 mm. when measured on the circle), and 9 mm., respectively.

Flat magnet rings, having an outer diameter of 76 mm., an inner diameter of 26 mm. and a thickness of 9 mm., are inserted into the holes in such a way that the northern poles of all of the magnets are on the one side and the southern poles of all of the magnets are on the other side of the aluminum disc.

Thereafter two circular plates, made of non-magnetizable polished stainless steel are fixed concentrically onto both sides of the aluminum disc using an epoxy resin with heat resistance up to 120° C, and the disc is subjected to heat-treatment in a vulcanizing press at 60° for 2 hours.

After cooling, the annular gap between the two steel plates along the edge of the aluminum disc is filled in with the above epoxy resin, and the resin is polymerized without heating. Thus no catalyst particles can adhere to the edge of the disc.

The discs are arranged on a common shaft so that the neighbouring discs face each other with opposite polarity, and the mid-points of the magnet rings are arranged on common imaginary lines parallel with the shaft.

The viscosity of the suspension at room temperature is 9 cP. Before hydrogenation the catalyst had a particle size range of between 45 nm and 15 nm but, due to the comminution occurring in the hydrogenation process, the suspension to be worked up also contains a substantial proportion of catalyst particles with a diameter below 15 nm.

The discs are rotated with a peripheral velocity of 60.3 mm./sec. The magnetic field intensity amounts to 950—1050 oersteds at the liquid surface. The discs revolve at the immersed side in a direction opposite to the direction of flow of the liquid. As the nickel catalyst adheres to the disc surfaces, it is removed above the liquid level by means of slanted doctor blades sloping in the direction of flow of the liquid.

The thus-recovered Raney-nickel catalyst has a particle size of from 15 to 45 nm. It is recirculated without further treatment to the glucose solution which is the starting material for the production of sorbitol. The sorbitol solution, leaving the magnetic separator and containing both nickel oxide and the non-removed catalyst particles, is mixed with 0.3 kg. of a sedimentation adjuvant and then the solids are separated from the liquid phase in a filter press. The sorbitol remaining in the filter cake is washed with 10 liters of water and the colorless, clear solution is recirculated as solvent for the glucose in the starting stage of the manufacture of sorbitol.

EXAMPLE 2

33.5 kg. of a melt obtained from the hydrogenation of sunflower oil, having a viscosity of 8.6 cP and containing 0.82 kg. of suspended Raney-nickel catalyst is allowed to stream at a temperature of 105° —115° C and at a linear velocity of 85 mm/second through an equipment as described in Example 1. The magnetic field intensity is set to 1000 oersteds.

Before hydrogenation the catalyst had a particle size of 40 to 100 nm. During the hydrogenation process the particles of the catalyst are broken into smaller pieces and thus particles having a diameter smaller than 25 nm are also obtained. The size of the catalyst particles adhered to the magnets amount to 34 –100 nm. This fraction of catalyst is washed with gasoline and then recirculated into the hydrogenating equipment.

EXAMPLE 3

20 kg. of the fraction having a particle size of between 60 nm and 180 nm of a NiAl alloy containing 40% by weight of nickel are suspended in 400 liters of water and while stirring 50 kg of a 40% by weight aqueous NaOH solution are added to the suspension. The hydrogen gas evolved during the reaction between the NaOH and the alloy is led away after separating the liquid particles contained therein. The temperature of the reaction mixture rises to 75°–80° C. The termination of the dissolution of aluminum is shown by the ceasing of the gas evolution.

The thus-obtained suspension containing Raney-nickel catalyst with a particle size of about from 15 to 150 nm is allowed to flow at a linear rate of 70 mm/sec. in the equipment as described in Example 1 at a temperature of 40° to 50° C. In this way 8.9 kg. of Raney-nickel catalyst having a particle size of between 35 nm and 150 nm are separated.

What we claim is:

1. A process for recovering suspended metal catalysts with pre-determined particle size distribution from their suspension in a liquid phase, in which the suspension is subjected to the effect of a continuously moving magnetic field of a minimum intensity of 200 oersteds produced with at least two discs rotating on a common shaft and immersed into the suspension at most by 50% of their surface area, said rotating at the immersed side being in a direction opposite to the direction of the flow of liquid, the said discs each having at least four magnets mounted onto them in lines parallel with the shaft and wherein neighbouring discs face each other with opposite polarity, wherein the ratio, expressed in terms of absolute values, between the flow velocity $v_s$ of the suspension and the rate of movement $v_m$ of the magnetic field expressed as the peripheral velocity at the edge of the said rotating discs, is adjusted to between 1 and 2, and the ratio, expressed in terms of absolute values, between the magnetic field intensity H in oersteds and the distance d of two neighbouring discs in mm is adjusted to between 60 and 150.

* * * * *